US007573421B2

(12) United States Patent
Safran et al.

(10) Patent No.: US 7,573,421 B2
(45) Date of Patent: Aug. 11, 2009

(54) SYSTEM AND METHOD FOR THE AUTOMATIC CONTROL OF VIDEO FRAME RATE

(75) Inventors: Israel Safran, Herzelia (IL); Moti Shabtai, Rosh Ha'ayin (IL)

(73) Assignee: Nice Systems, Ltd., Raanana (IL)

( * ) Notice: Subject to any disclaimer, the term of this patent is extended or adjusted under 35 U.S.C. 154(b) by 364 days.

(21) Appl. No.: 10/490,685

(22) PCT Filed: Sep. 24, 2002

(86) PCT No.: PCT/IL02/00785

§ 371 (c)(1),
(2), (4) Date: Aug. 10, 2004

(87) PCT Pub. No.: WO03/028358

PCT Pub. Date: Apr. 3, 2003

(65) Prior Publication Data

US 2005/0046611 A1 Mar. 3, 2005

Related U.S. Application Data

(60) Provisional application No. 60/324,056, filed on Sep. 24, 2001.

(51) Int. Cl.
*H04N 7/01* (2006.01)
*G01S 7/04* (2006.01)
*G01S 7/00* (2006.01)
*G01S 13/00* (2006.01)

(52) U.S. Cl. .................. 342/185; 342/175; 342/176; 342/195; 348/441; 348/443

(58) Field of Classification Search .................. 342/52, 342/55, 175, 176, 185, 195–197; 348/441–459, 348/21–24; 375/242, 244–252
See application file for complete search history.

(56) References Cited

U.S. PATENT DOCUMENTS 3,810,174 A * 5/1974 Heard et al. ................. 342/185
3,904,817 A * 9/1975 Hoffman et al. ............. 348/442
4,057,836 A * 11/1977 Munsey ....................... 348/22

(Continued)

FOREIGN PATENT DOCUMENTS

DE          10358333          7/2005

(Continued)

OTHER PUBLICATIONS

NiceVision—Secure your Vision, NICE Systems, Ltd., 2002.

(Continued)

*Primary Examiner*—Bernarr E Gregory
(74) *Attorney, Agent, or Firm*—Ohlandt, Greeley, Ruggiero & Perle, L.L.P.

(57) ABSTRACT

The video rate processor (10) is made up of an Input Video Stream input (11), at least one Input Processor/Input Devices (12), at least one Most Recent Frame Buffer (14), and at least one Output Processes/Output Device (16). The video rate processor (10) is dynamically tuned to the specific requirements of a user and the capabilities of the user's device. Further, the video rate processor (10) enables to receipt of video images in real time or from archived files while substantially maintaining the integrity of the video information.

26 Claims, 3 Drawing Sheets

U.S. PATENT DOCUMENTS

| | | | |
|---|---|---|---|
| 4,145,715 | A | 3/1979 | Clever |
| 4,271,431 | A * | 6/1981 | Steber .................... 348/22 |
| 4,298,888 | A * | 11/1981 | Colles et al. ............ 348/446 |
| 4,527,151 | A | 7/1985 | Byrne |
| 4,821,118 | A | 4/1989 | Lafreniere |
| 5,051,827 | A | 9/1991 | Fairhurst |
| 5,091,780 | A | 2/1992 | Pomerleau |
| 5,303,045 | A | 4/1994 | Richards et al. |
| 5,307,170 | A | 4/1994 | Itsumi et al. |
| 5,353,618 | A | 10/1994 | Crick |
| 5,404,170 | A | 4/1995 | Keating |
| 5,491,511 | A | 2/1996 | Odle |
| 5,519,446 | A | 5/1996 | Lee |
| 5,734,441 | A | 3/1998 | Kondo et al. |
| 5,742,349 | A | 4/1998 | Choi et al. |
| 5,751,346 | A | 5/1998 | Dozier et al. |
| 5,790,096 | A | 8/1998 | Hill, Jr. |
| 5,796,439 | A | 8/1998 | Hewett et al. |
| 5,847,755 | A | 12/1998 | Wixson et al. |
| 5,895,453 | A | 4/1999 | Cook et al. |
| 5,920,338 | A | 7/1999 | Katz |
| 6,014,647 | A | 1/2000 | Nizzar et al. |
| 6,028,626 | A | 2/2000 | Aviv et al. |
| 6,031,573 | A | 2/2000 | MacCormack et al. |
| 6,037,991 | A | 3/2000 | Thro et al. |
| 6,070,142 | A | 5/2000 | McDonough et al. |
| 6,081,606 | A | 6/2000 | Hansen et al. |
| 6,092,197 | A | 7/2000 | Coueignoux |
| 6,094,227 | A | 7/2000 | Guimier |
| 6,097,429 | A | 8/2000 | Seely et al. |
| 6,111,610 | A | 8/2000 | Faroudja |
| 6,134,530 | A | 10/2000 | Bunting et al. |
| 6,138,139 | A | 10/2000 | Beck et al. |
| 6,167,395 | A | 12/2000 | Beck et al. |
| 6,170,011 | B1 | 1/2001 | Beck et al. |
| 6,212,178 | B1 | 4/2001 | Beck |
| 6,230,197 | B1 | 5/2001 | Beck et al. |
| 6,295,367 | B1 | 9/2001 | Crabtree et al. |
| 6,327,343 | B1 | 12/2001 | Epstein et al. |
| 6,330,025 | B1 | 12/2001 | Arazi et al. |
| 6,345,305 | B1 | 2/2002 | Beck et al. |
| 6,404,857 | B1 | 6/2002 | Blair et al. |
| 6,427,137 | B2 | 7/2002 | Petrushin |
| 6,441,734 | B1 | 8/2002 | Gutta et al. |
| 6,549,613 | B1 | 4/2003 | Dikmen |
| 6,559,769 | B2 | 5/2003 | Anthony et al. |
| 6,570,608 | B1 | 5/2003 | Tserng |
| 6,604,108 | B1 | 8/2003 | Nitahara |
| 6,628,835 | B1 | 9/2003 | Brill et al. |
| 6,704,409 | B1 | 3/2004 | Dilip et al. |
| 7,076,427 | B2 | 7/2006 | Scarano et al. |
| 7,103,806 | B1 | 9/2006 | Horvitz |
| 2001/0043697 | A1 | 11/2001 | Cox et al. |
| 2001/0052081 | A1 | 12/2001 | McKibben et al. |
| 2002/0005898 | A1 | 1/2002 | Kawada et al. |
| 2002/0010705 | A1 | 1/2002 | Park et al. |
| 2002/0059283 | A1 | 5/2002 | Shapiro et al. |
| 2002/0087385 | A1 | 7/2002 | Vincent |
| 2003/0059016 | A1 | 3/2003 | Lieberman et al. |
| 2003/0128099 | A1 | 7/2003 | Cockerham |
| 2003/0163360 | A1 | 8/2003 | Galvin |
| 2004/0098295 | A1 | 5/2004 | Sarlay et al. |
| 2004/0141508 | A1 | 7/2004 | Schoeneberger et al. |
| 2004/0161133 | A1 | 8/2004 | Elazar et al. |
| 2004/0249650 | A1 | 12/2004 | Freedman et al. |
| 2006/0093135 | A1 | 5/2006 | Fiatal et al. |

FOREIGN PATENT DOCUMENTS

| | | |
|---|---|---|
| EP | 1484892 | 8/2004 |
| GB | 2352948 A | 7/2001 |
| WO | WO 95/29470 A | 11/1995 |
| WO | WO 98/01838 A | 1/1998 |
| WO | WO 00/73996 | 12/2000 |
| WO | 0237858 | 5/2002 |
| WO | WO 03/013113 A2 | 2/2003 |
| WO | WO 03/067360 A2 | 8/2003 |
| WO | WO 03/067884 A1 | 8/2003 |
| WO | 2004009125 | 10/2004 |

OTHER PUBLICATIONS

NICE Systems announces New Aviation Security Initiative, reprinted from Security Technology & Design, Dec. 2001.

"The Camera That Never Sleeps", Yediot Aharonot, Nov. 10, 2002.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

SEDOR Self-learning event detector, Internet pages from http://www.dallmeier-electronic.com, May 2003.

"The Computer at the Other End of the Line", Haaretz, Feb. 17, 2002.

A Data-Warehouse / OLAP Framework for Scalable Telecommunication Tandem Traffic Analysis—Oiming Chen, Meichun Hsu, Umesh Dayal—Ochen,mhsu,dayal@hpl.com.

Article Sertainty—Automated Quality Monitoring—SER Solutions, Inc.—21680 Ridgetop Circle Dulles, VA—WWW.ser.com.

Article Sertainty—Agent Performance Optimization—2005 SE Solutions, Inc.

Lawrence P. Mark SER—White Paper—Sertainty Quality Assurance—2003-2005 SER Solution Inc. p. 1-12.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text—Independent Speaker Identification Using Transformation Enhanced Multi-Grained Models—Upendra V. Chaudhari, Jiri Navatil, Ganesh N. Ramaswamy, and Stephane H. Maes—IB T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000 p. 19-41.

Yaniv Zigel and Moshe Wasserblat—How to deal with multiple-targets in speaker identification systems?

Frederic Bimbot et al.—A Tutorial on Text—Independent Speaker Verification EURASIP Journal on Applied Signal Processing 2004:4, 430-45.

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on speech and Audio Processing, vol. 4, 31-44.

Towards an Automatic Classification of Emotions in Speech—N. Amir. S. Ron.

\* cited by examiner

SYSTEM AND METHOD FOR THE AUTOMATIC CONTROL OF VIDEO FRAME RATE

RELATED APPLICATIONS

This application claims priority from U.S. provisional patent application No. 60/324,056 titled "AUTOMATIC CONTROL OF VIDEO RATE" filed Sep. 24, 2001.

BACKGROUND OF THE INVENTION

1. Field of the Invention

The present invention relates in general, to video surveillance and video storage systems and more specifically, to a system and method for automatically controlling the video frame rate of video streams.

2. Discussion of the Related Art

Many applications in the field of video surveillance and video storage require the transfer of video data such that the video frame rate is specifically controlled. These applications should typically involve an input process to generate video frames at the basic rate of the input process, and an associated output process, which requires video frames at a rate specifically required by the output process. Video frame rate adaptation is required in the video surveillance and storage field to solve several basic implementation issues.

Surveillance systems require the ability to view video clips either in real time where the data is available substantially simultaneously with an actual recording or off-line by utilizing previously recorded video data, which is typically stored in a local or remote archive. The best-known and available communication media for remote video viewing is the Internet. Access to a plurality of video files stored across the Internet is readily provided by substantially any standard computing device. To access, to transfer and to view video via from the Internet does not require specific installations of unique hardware or software components. Standard Web browser utilities, such as the Internet Explorer or the Netscape Navigator, which is typically pre-installed in the majority of computing devices, and similarly pre-installed standard widely available communication devices, such as modems or network interface cards, provide ready accessibility to video images over the Internet.

The drawback of utilizing the Internet as a source media and a transfer media for the transfer and the viewing of video files concerns the lack of Quality of Service since there is typically no guarantee for a fixed-rate transmission bandwidth availability. Currently, the transmission rate of the data during Internet sessions fluctuates significantly. Thus, the attempts to achieve a pre-determinedly fixed transmission data rate for viewing pre-determinedly fixed frame rate video is not practical.

Video information archiving requires relatively high storage capacity. In the surveillance field, when video recordings, captured by a plurality of Close Circuit Television (CCTV) video cameras, needs to be archived for substantially extended periods, the required storage capacity might become a considerable cost issue. As a result, in many situations it would be economical to control the size of the required storage space by adjusting the archived video frame rate to the availability of the storage space.

Surveillance systems are characterized by the necessity to provide alarm signals and dynamic recording functions for identified events that typically occur at rare instances. In a surveillance system an event constitutes an electronic trigger generated by some device that senses disturbance in the environment. An event might be generated for example, by the opening of a door or a window in the environment under surveillance, which is captured by a movement-sensing device or by a video motion detector. Most of the time, the systems monitor a substantially static environment, which does not provide significant event-specific information. Thus, for extended periods the surveillance systems operate typically in a "wait-state" during which continuous attempts are made in order to identify critical events. It is imperative that critical events would be recorded and that simultaneously generate an associated alarm signal. When a critical event occurs, the recording of the video needs to be performed with the highest possible quality. In the "wait-state", during the substantially static or "quite" periods, a lower recording rate, requiring less storage space, could be activated in order to provide a better trade-off.

One obvious solution might be to switch to a higher recording rate when the event happens. The drawback of this solution is that an inevitable minor delay between the event and the start of the high recording rate could effect the missing of some of the important information that is in the video images representing the event occurrence.

Surveillance systems often require the capability of monitoring the same video source, such as a video camera, where the recording is to be transmitted to several viewers, where each viewer is having its own bandwidth viewing capability in accordance with the respective communication devices, communication lines, location, viewing apparatus and the like. When using conventional analog CCTV cameras, the multi-monitoring capability is usually provided via amplifiers, splitters, and coaxial cable routing the signal to the various users. When using video cameras having digital (Web enabled) output (typical example is model # 2420 manufactured by AXIS Communications of Lund Sweden), the distribution of the video to several viewers is more problematic. One solution might be the use of multi-cast IP massages that are routed to the users that are in the addressee list of the multi-cast massage. The drawback of this solution is that all the users will get the same information rate that will have to be reduced to the lowest common denominator.

SUMMARY OF THE PRESENT INVENTION

One aspect of the present invention regards a system for video rate control of at least one information units stream. The system comprises the elements of a first storage area to hold the at least one information unit stream stored at a low video frame rate, a second storage area to hold the at least one information units stream stored at a high video frame rate, an at least one input handling entity to store the at least one information unit stream into the first storage area at a low video frame rate and to store the at least one information units stream into the second storage area at a high video frame rate, an at least one output handling entity for outputting the at least one information units stream from the first storage area and for outputting the at least one information units stream from the second storage area, and a storage area selector entity for controlling the selection of the first storage area and the second storage area for the application of the input handling entity and the output handling entity to the at least one information units stream stored in the first storage area and the second storage area.

A second aspect of the present invention regards a method for video rate control of at least one information units stream. The method comprises the steps of storing an at least one information unit stream at a low video frame rate into a first storage area, storing the at least one information unit stream at a high video frame rate into a second storage area, selectively outputting the at least one information unit stream stored in the first storage area and in the second storage area, and controlling the application of an input handling entity and an output handling entity to the at least one information unit stream stored in the first storage area and the at least one information unit stream stored in the second storage area consequent to the occurrence of an at least one event.

A third aspect of the present invention regards a system for the automatic unit rate control of an information units stream, the system comprising an information units stream processor device to receive at information units stream from an information units stream generating device, to selectively control the outputted unit rate of the information units stream and to output the unit rate controlled information unit stream to an information units stream display device. The information unit stream processor device further comprises the elements of an inputted information units stream having a pre-defined unit rate and carrying distinct information units; an input handling entity to receive the inputted information units stream and to store selectively the information unit into a storage area; a storage area to hold the information unit received from the input handling entity; an output handling entity to obtain the information unit from the storage area to regulate the unit rate of the information units stream and to output the information units stream; and an information unit rate control mechanism to provide automatic unit rate control in order to regulate the unit rate of the outputted information units stream. The information unit stream is inputted from the information units stream generator device. The information units stream is outputted to an information unit stream display device. The information units stream include rich media. The information units stream can be a video stream. The information unit can be a video frame. The information unit stream generator device can be a surveillance video camera device. The information units stream display device can be a surveillance video monitor. The information units stream processor device can be a video rate processor device. The video rate processor device is operative in the selective unit rate control of a video stream received from a surveillance video camera via the communication media and forwarded to a surveillance video monitor via a communication media. The input handling entity can be a standalone hardware device. The input handling entity is a software routine implemented in a computing device and running within the processor of the computing device. The output handling entity is a standalone hardware device. The output handling entity is a software routine implemented in a computing device and running within the processor device of the computing device. The unit rate control of the outputted information units stream is further regulated internally by an in-built timing mechanism associated with the output handling entity. The unit rate control of the outputted information unit stream is further regulated by the pre-defined characteristics of the output handling entity. The unit rate control of the outputted information units stream is further regulated by the pre-defined characteristics of the communication media. The storage area can be implemented on a media storage device. The media storage device can be a hard disk device. The media storage device can be a tape device. The media storage device can be a DVD device. The communication media can be the Internet or an Intranet or a wireless communications network or a telephone network or a local network or a wide area network or a cellular network.

A fourth aspect of the present invention regards a method for the automatic unit rate control of an information units stream, the method comprising the steps of receiving an information units stream having a pre-defined unit rate from an information unit generator device via a communication media by an input handling entity; storing an information unit from the information units stream into a storage area by the input handling entity; reading the information unit from the storage area by an output handling entity, and controlling the operation of an output handling entity by an unit rate control mechanism to provide for a specific unit rate of the outputted information units stream. The method further comprising the step of outputting an information units stream having a controlled specific unit rate by the output handling entity to an information units stream display device via a communication media. The unit rate of the outputted information units stream generated by the output handling entity is controlled by an in-built timing mechanism associated with the output handling entity. The unit rate of the outputted information units streams is further controlled the pre-defined characteristics of the output handling entity. The unit rate of the outputted information units streams is further controlled the pre-defined characteristics of the transmission media.

A fifth aspect of the present invention regards a method for generating a plurality of information units streams, provided with diverse unit rates, from a single information units stream having a pre-defined unit rate and distributing the plurality of the information unit streams, the method comprising the steps of inputting the information units stream from an information units stream generator device to a plurality of information units rate control devices; controlling the operation of the plurality of information units rate control devices via a plurality of unit rate control mechanisms in order to provide diverse unit rates to a plurality of outputted information units streams; storing the plurality of outputted information units streams into a plurality of data storage files associated with a media storage device thereby creating a plurality of information units stream data storage files with variable unit rate characteristics. The method further comprises transmitting the plurality of data storage files to a plurality of information units stream display devices in accordance with the available bandwidth associated with the display devices. The process of the data storage file generation is automatically controlled by and associated with the occurrence of an environmental event. The transmission of a specific data storage file to the information units stream display device is controlled by and associated with the occurrence of an environmental event. The transmission of the data storage files storing information units streams having diverse unit rate characteristics to the information units stream display device is controlled by and associated with the occurrence of an environmental event. The occurrence of the environmental event and the lack thereof effect pre-defined, content-specific, unit-rate-specific and timed interactions among the data storage files.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
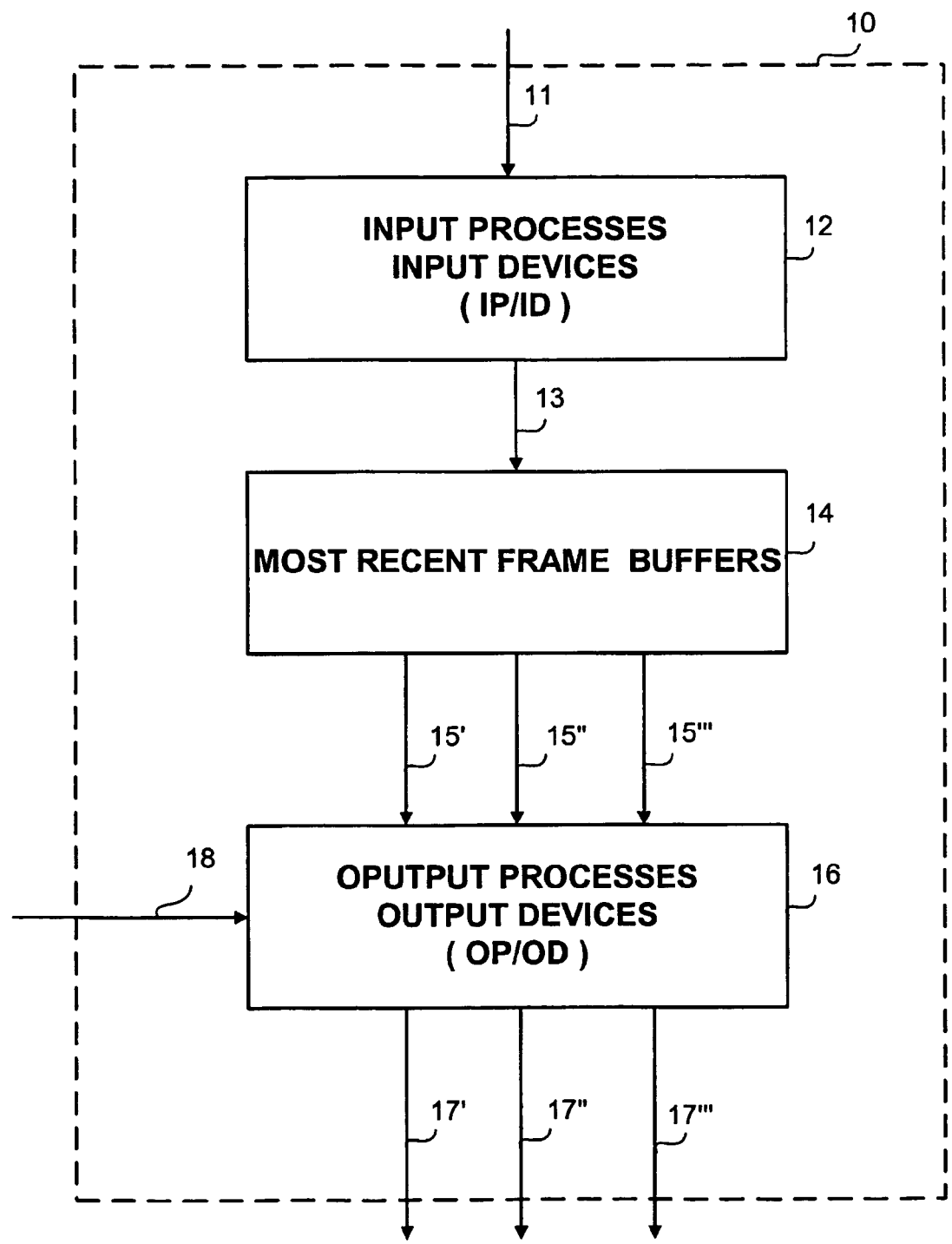
FIG. 1 is a schematic illustration of the Video Rate Processor, in accordance with a preferred embodiment of the present invention.

The proposed invention describes a system and method that automatically provides the video frame rate required and supported by an output device out of a set of the video frames generated by an input device, while maintaining the integrity of the video information. In the preferred embodiment of the invention the system and method is designed and developed for use in surveillance systems. In other preferred embodiments the proposed system and method could be used for different purposes.

The proposed system and method enables reception of meaningful video images, in real time, from local archives or from remote archive through the Internet, using an automatic video frame rate control. The system and method enables adaptive modifications in the rate of transmitting the video frames in accordance with the available bandwidth.

The proposed system and method enables the controlled archiving rate while maintaining high real-time video frame rate, which provides high-quality real-time video viewing capability with reduced archived quality for a lower storage costs. The incoming video stream is recorded onto an archiving media and generates one or more video files thereon. The type of the archiving media could include but is not limited to a tape drive a hard disk or the like. The video files are recorded using different frame rates by utilizing an automatic frame control method. Thus, a first file could keep a recording of the video stream with a low frame rate and a second file could record the video data with a higher frame rate. The first file having a low frame rate is stored on a storage device for an extended period. The second file is having a high frame rate and it is stored for a substantially limited period (typically less than an hour). The second file is continuously and dynamically updated by deleting of "old" video frames to free storage space for the insertion of "new" video frames. When a specific event occurs, the video frame deletion process regarding the second file is suspended, and the high frame rate video stored in the second file is available for monitoring, prior to the event, through the event and after the event. The process enables storage of video data for longer periods at a low frame rate while maintaining the possibility of monitoring high frame rate video data during specific events without the need to occupy in a pre-defined manner large and costly storage spaces.

The proposed system and method allows for the reproduction of the video stream at various video frame rates where the storage of the stream is dynamically tuned to the specific requirements of a user and/or the capabilities of the user's device.

A video frame is single electronically captured picture by a video camera. Video streams usually constitute consecutive frames captured by the camera at a rate of 30 or 25 frames per second. The concept of the proposed system and method is based on the fact that a video signal is composed of a plurality of video frames where each frame constitutes a complete information package representing an autonomous data element.

Referring now to FIG. 1 that describes the operation of the Video Rate Processor (VRP) 10. The VPR 10 comprises an Input Video Stream (IVS) 11, one or more Input Processes/Input Devices (IP/ID) 12, one or more Most Recent Frame Buffers (MCFB) 14 and one or more Output Processes/Output Devices (OP/OD) 16. An Input Video Stream (IVS) 11 is fed into the suitable IP/ID 12. The IVS 11 could be a communication line into a processor or a software interface installed in a computing device. The IVS 11 is composed of video frames that enter the Input Process/Input Device 12 (IP/ID) where the stream is parsed in order to build a set of the unique autonomous video frames. The IP/ID 12 could be implemented as a stand-alone processor or a computer program that runs on a processor device in which the preferred embodiment of the present invention is implemented. The IP/ID 12 stores continuously the last received frame of the IVS 11 into a temporary storage of the MRFB 14. The MRFB 14 includes several buffer storage areas where each area contains a single autonomous frame. The MRFB 14 is implemented such that substantially simultaneous writes by the IP/ID 12 and substantially simultaneous reads by the OP/OD 16 are enabled. The temporary buffer storage might be implemented on a computer RAM hard disk or any other storage device. The connection between the IVS 11 and the MRFB 14 could be implemented through the performance of a common access/store/seek/retrieve command interface in a computer or through a special hardware interface to a memory device.

Still referring to FIG. 1 one or more OP/OD 16 are linked to the MRFB 14 in order to obtain the most recently stored video frames from the suitable buffer areas. The OP/OD 16 accesses and reads the appropriate data via pre-defined, suitably coordinated and properly timed procedures. The connection from the OP/OD 16 to the MRFB 14 can be implemented by a standard computer read/write command interface or by a special hardware interface. The OP/OD 16 delivers output video streams (OVS) 17', 17" and 17'" composed of the concatenated video frames. The OP/OD 16 could be implemented as a stand-alone processor or a specifically designed and developed computer program that runs on a processor in which the preferred embodiment of the invention is implemented. The OVS 17 could be a communication line from a processor or a software interface within a computing device. The rate at which the OP/OD 16 reads the MRFB 14 can be controlled by an external rate control input (RC) 18, by an internal rate control mechanism, or by the OVS 16 own predetermined data rate. In the first case an external interface tasks the OP/OD 16 through the RC 18 interface to extract and send the data from the MRFB 14 to the OP/OD 16. In the second case an internal fixed rate mechanism generated from an internal clock device within the processor tasks the OP/OD 16. In the third case the OP/OD 16 sends the video frames through the OVS 17 interface at its own pre-defined frame rate. Consequent to the completion of the sending of the data by the interface (some buffering may be implemented), the OP/OD 16 reads the MRFB 14 repeatedly in order to obtain and send a new frame. In this case the process adapts the video frame rate to instantaneous bandwidth of the OVS 17. Each of the OP/OD 16 could be provided with its own independent frame rate control mechanism and could deliver the data to the OVS 17 at its own independent and pre-defined rate.

Still referring to FIG. 1 when the recorded video data is transferred for viewing over the Internet the following process is performed. The video rate processor (VRP) 10 receives video streams from CCTV cameras or from archived video files and transmits the streams to the Internet through the OVS 17', 17" and 17'". The processor 10 adapts itself to the available bandwidth of the Internet by reading the MRFB 14 consequent to the sending of the previous frame. The indication that the previous frame was sent is received from the TCP/IP protocol implemented in the processor and commonly used to transmit data over the Internet.

Figure 2:
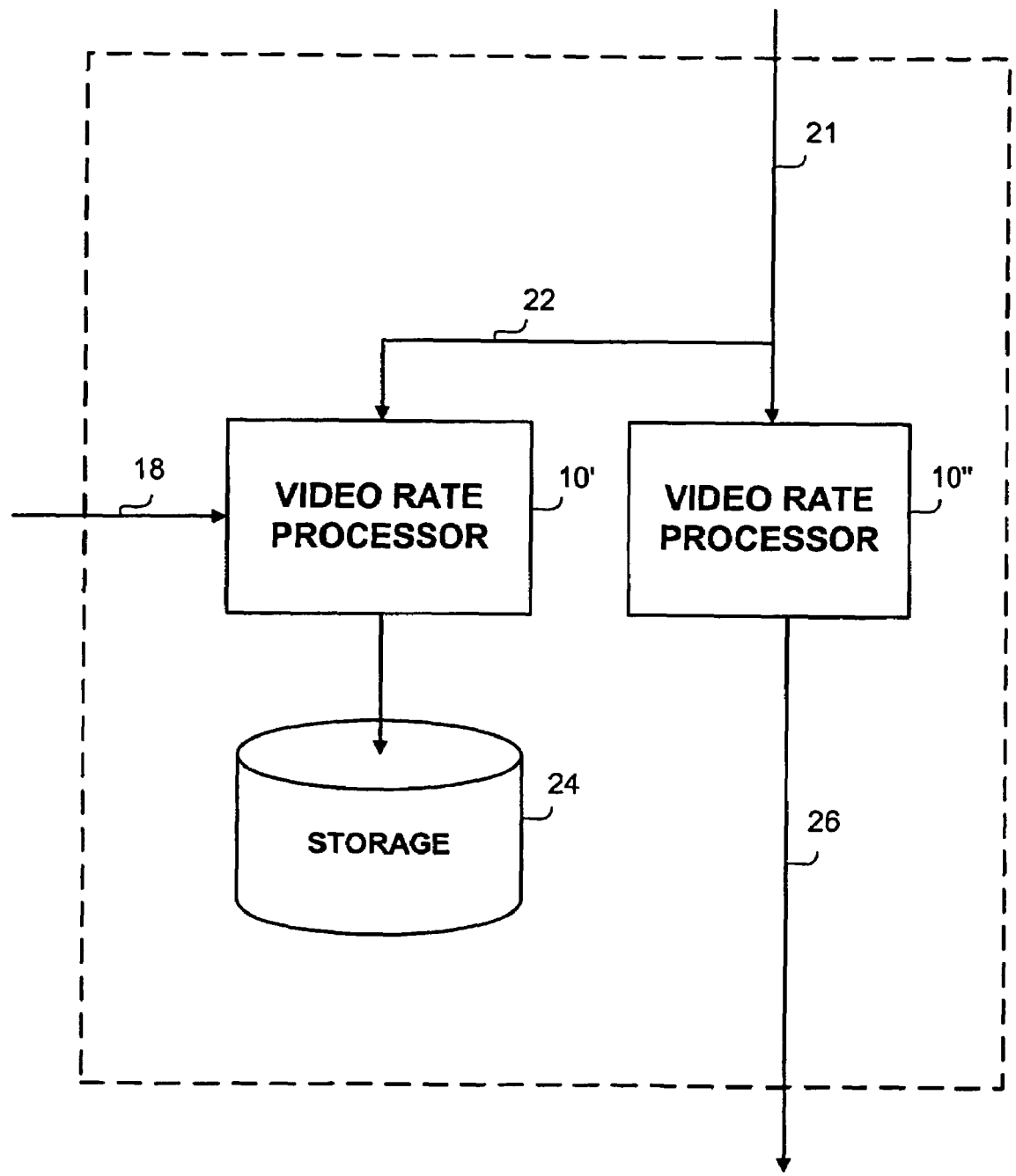
FIG. 2 is a schematic illustration of controlled archiving rate application, in accordance with a preferred embodiment of the present invention.

Referring now to FIG. 2 that illustrates a controlled archiving rate application in accordance with a preferred embodiment of the present invention. The application enables storing of video data at a low rate to preserve storage while enabling the viewing of real-time video at a high rate. In the preferred embodiment of the invention an Input Video Stream (IVS) 21 feeds two Video Rate Processors (VRP) 10' and 10". The first VRP 10' is connected to the storage device 24 and receives rate control commands 18 from the controlling system, which determines at what rate should the video frames be recorded. The second VRP 10" controls the transmission of real time video at the Output Video Stream (OVS) 26, adjusting it to the required rate or to the available bandwidth of the OVS interface 26.

Figure 3:
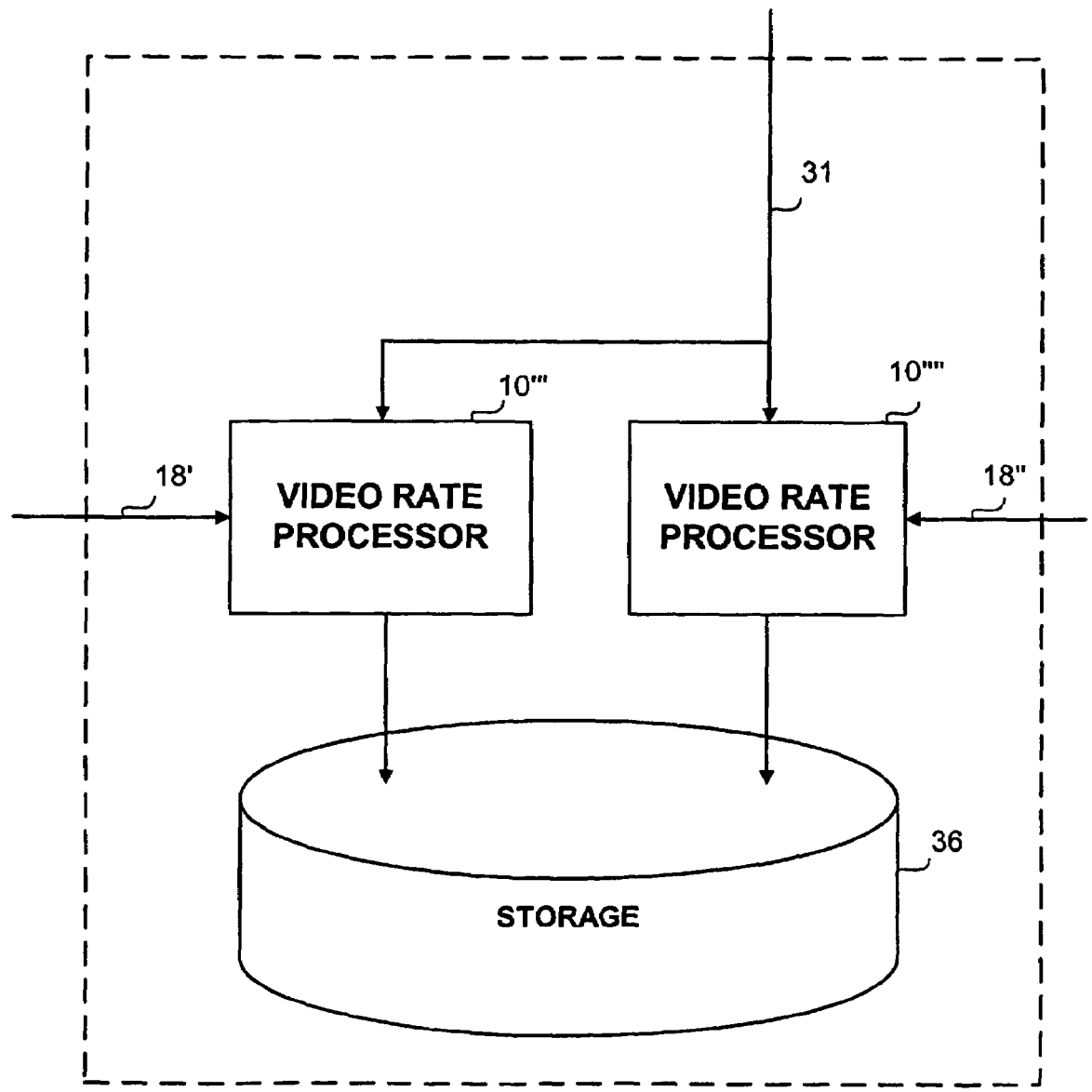
FIG. 3 is a schematic illustration the multi-track video archiving application, in accordance with a preferred embodiment of the present invention.

Referring now to FIG. 3 that illustrates a multi-track archiving of video application. The application enables storing of video at two different rates. The higher rate is used for storing video for a limited duration to enable a viewing of high quality video in case of an event occurring. The lower rate is used for storing video for extended durations in order to effect substantial saving of storage space. In the preferred embodiment of the invention, an Input Video Stream (IVS) 31 feeds two VRPs 10''' and 10''''. Each VRP has its own Rate Control (RC) input 18' and 18" respectively. Both VRPs 10''' and 10'''' feed the storage device 36 and create two duplicate files of the same video, one with a high frame rate and the other with a low frame rate.

The disclosed system and method enables control of the video speed in various components of a surveillance and storage system and the adaptation to the bandwidth transmitted to the viewers thereby making it Internet ready. The system and method further enables multi track recording on a storage device at various video frame rates and the distribution of a single video source to several viewers each with its own required video rate.

The person skilled in the art will appreciate that what has been shown is not limited to the description above. The person skilled in the art will appreciate that examples shown here above are in no way limiting and serve to better and adequately describe the present invention. Those skilled in the art to which this invention pertains will appreciate the many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. Persons skilled in the art will appreciate that the present invention is not limited to what has been particularly shown and described hereinabove. Rather the scope of the present invention is defined by the claims, which follow.

The invention claimed is:

1. A method for the video control of at least one information unit stream, the method comprising the steps of:
   storing an at least one information unit stream at a low video frame rate into a first storage area;
   storing the at least one information unit stream at a high video frame rate into a second storage area;
   selectively outputting the at least one information unit stream stored in the first storage area and in the second storage area; and
   controlling the application of an input handling entity and an output handling entity to the at least one information unit stream stored in the first storage area and the at least one information unit stream stored in the second storage area consequent to the occurrence of an at least one event.

2. The method of claim 1 further comprising the step of outputting an at least one information unit stream having a controlled specific unit rate by the at least one output handling entity to an at least one information unit stream display device via a communication media.

3. The method as claimed in claim 1 wherein the unit rate of the at least one outputted information unit stream generated by the at least one output handling entity is controlled by an in-built timing mechanism associated with the at least one output handling entity.

4. The method as claimed in claim 1 wherein the unit rate of the at least one outputted information unit streams is further controlled by the pre-defined characteristics of the at least one output handling entity.

5. The method as claimed in claim 1 wherein the unit rate of the at least one outputted information unit streams is further controlled by a pre-defined characteristic of the communication media.

6. The method as claimed in claim 1 wherein the at least one information unit stream is a digital information stream.

7. The method as claimed in claim 1 wherein the occurrence of the at least one event is detected automatically.

8. The method as claimed in claim 1 further comprising the step of continuously deleting the at least one information unit stream stored in the second storage area.

9. The method as claimed in claim 8 further comprising the step of stopping the deletion of the at least one information unit stream stored in the second storage area if an event has occurred.

10. The method as claimed in claim 1 wherein the method is used in a surveillance system, for adapting the unit rates to available resources.

11. A method for generating a plurality of information unit streams, provided with diverse unit rates, from at least one information unit stream having a pre-defined unit rate and distributing the plurality of the information unit streams, the method comprising the steps of:
    inputting the at least one information unit stream from an at least one information unit stream generator device to a plurality of information unit rate control devices;
    controlling the operation of the plurality of information unit rate control devices via a plurality of unit rate control mechanisms in order to provide diverse unit rates to a plurality of outputted information unit streams;
    storing the plurality of outputted information unit streams into a plurality of data storage files associated with at least one media storage device;
    thereby creating a plurality of information unit stream data storage files with variable unit rate characteristics.

12. The method as claimed in claim 11 further comprising transmitting the plurality of the data storage files to a plurality of information unit stream display devices in accordance with available communication bandwidth.

13. The method as claimed in claim 11 wherein the process for the generation of the data storage file is automatically controlled by and associated with the occurrence of at least one environmental event.

14. The method as claimed in claim 11 wherein the transmission of a specific data storage file to the information unit stream display device is controlled by and associated with the occurrence of at least one environmental event.

15. The method as claimed in claim 11 wherein the transmission of the data storage files storing information unit streams having diverse unit rate characteristics to at least one information unit stream display device is controlled by and associated with the occurrence of at least one environmental event.

16. The method as claimed in claim 11 wherein the occurrence of the at least one environmental event and the lack thereof effect pre-defined, content-specific, unit-rate-specific and timed interactions among the data storage files.

17. The method as claimed in claim 11 wherein the data storage files are short-term buffer storage files.

18. The method as claimed in claim 11 wherein the data storage files are long-term archive storage files.

19. The method as claimed in claim 18 wherein the long-term archive files are used in off-line distribution of the recorded information unit stream.

20. The method as claimed in claim 11 wherein the short-term buffer storage files are operative in the distribution of the recorded information unit stream in real time.

21. The method as claimed in claim 11 wherein at least one information unit stream is a digital information stream.

22. The method as claimed in claim 11 wherein the occurrence of the at least one event is detected automatically.

23. The method as claimed in claim 11 further comprising the step of continuously deleting the at least one information unit stream stored in the second storage area.

24. The method as claimed in claim 23 further comprising the step of stopping the deletion of the at least one information unit stream stored in the second storage area if the at least one event was detected.

25. The method as claimed in claim 11 wherein the method is used in a surveillance system, for adapting the unit rates to available resources.

26. A method for generating a plurality of information unit streams, provided with diverse unit rates, from at least one information unit stream having a pre-defined unit rate and distributing the plurality of the information unit streams, the method comprising the steps of:

inputting the at least one information unit stream from an at least one information unit stream generator device to a plurality of information unit rate control devices;

controlling the operation of the plurality of information unit rate control devices via a plurality of unit rate control mechanisms in order to provide diverse unit rates to a plurality of output information unit streams;

storing an at least one information unit stream at a low video frame rate into a first storage area;

storing the at least one information unit stream at a high video frame rate into a second storage area;

selectively outputting the at least one information unit stream stored in the first storage area and in the second storage area;

continuously deleting the at least one information unit stream stored in the second storage area; and stopping the continuous deletion if an event was detected.

* * * * *